United States Patent
Bostick et al.

(10) Patent No.: US 8,250,237 B2
(45) Date of Patent: Aug. 21, 2012

(54) COMMUNICATION WITH DATABASE CLIENT USERS

(75) Inventors: James E. Bostick, Ceder Park, TX (US); Randolph M. Forlenza, Austin, TX (US); John P. Kaemmerer, Pflugerville, TX (US); Raghuraman Kalyanaraman, Austin, TX (US); Courtney J. Spooner, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 12/061,589

(22) Filed: Apr. 2, 2008

(65) Prior Publication Data

US 2008/0215693 A1 Sep. 4, 2008

Related U.S. Application Data

(63) Continuation of application No. 11/337,262, filed on Jan. 20, 2006, now abandoned.

(51) Int. Cl.
  *G06F 15/16* (2006.01)
  *G06F 15/173* (2006.01)
(52) U.S. Cl. ........................................ 709/245; 709/224
(58) Field of Classification Search .................. 709/224, 709/245; 707/10, 102, 104.1
See application file for complete search history.

(56) References Cited

U.S. PATENT DOCUMENTS

| | | | |
|---|---|---|---|
| 5,761,696 A | 6/1998 | Giordano et al. | |
| 5,890,148 A * | 3/1999 | Bhargava et al. | 707/2 |
| 6,058,389 A * | 5/2000 | Chandra et al. | 707/1 |
| 6,182,075 B1 | 1/2001 | Hsu | |
| 6,789,112 B1 | 9/2004 | Freeman et al. | |
| 6,868,544 B2 | 3/2005 | Dalal et al. | |
| 6,920,475 B1 | 7/2005 | Klots et al. | |
| 2002/0049903 A1 | 4/2002 | Ussery et al. | 713/165 |
| 2002/0111986 A1* | 8/2002 | Wolfson | 709/200 |
| 2003/0220945 A1 | 11/2003 | Malik et al. | 707/203 |
| 2003/0221023 A1 | 11/2003 | Peddada et al. | 719/330 |

(Continued)

FOREIGN PATENT DOCUMENTS

CN 1283015 A 2/2001

(Continued)

OTHER PUBLICATIONS

"SQL Server 2000 quickies [Archive]" by RSINGH, VBFourms ,(Feb. 2002), pp. 2-3.*

(Continued)

*Primary Examiner* — Asad M Nawaz
*Assistant Examiner* — Nicholas Jensen
(74) *Attorney, Agent, or Firm* — Schmeiser, Olsen & Watts; Mark Vallone

(57) ABSTRACT

Embodiments may include a database messaging system having a database server in communication with one or more database clients. The database server may include a database messaging module, which may include a database administrator (DBA) interface module to receive a message request, where the message request includes message content and an indication of one or more database clients to which a message will be sent. The database messaging module may also include an address module to determine an IP address associated with each of the one or more database clients and a database messaging transmitter to transmit a message to each determined IP address, where the message may include the message content. The database clients may include a client listener for receiving the message from the database server and displaying it to a database client user's monitor.

12 Claims, 5 Drawing Sheets

U.S. PATENT DOCUMENTS

| | | | |
|---|---|---|---|
| 2004/0078446 A1* | 4/2004 | Daniell et al. | 709/206 |
| 2004/0122801 A1 | 6/2004 | Schirmer et al. | |
| 2004/0243851 A1 | 12/2004 | Lee et al. | |
| 2005/0198150 A1* | 9/2005 | Werner | 709/206 |
| 2006/0053194 A1* | 3/2006 | Schneider et al. | 709/204 |
| 2006/0224404 A1 | 10/2006 | Keusseyan | |
| 2007/0174417 A1 | 7/2007 | Bostick et al. | |
| 2007/0174477 A1 | 7/2007 | Bostick et al. | |
| 2007/0239755 A1* | 10/2007 | Mahoney | 707/102 |
| 2008/0222085 A1 | 9/2008 | Bostick | |
| 2008/0222264 A1 | 9/2008 | Bostick | |

FOREIGN PATENT DOCUMENTS

| | | |
|---|---|---|
| JP | 2000010805 | 1/2000 |

OTHER PUBLICATIONS

"DB Mail 2.5 User Guide", SoftTree Technologies (Jun. 2005), pp. 69-70, 125-134.*

Frank Kalis, Retriving host IP address via T-SQL, SQLServerCentral.com, Dec. 9, 2004 5:14AM.*

Certificate of Translation.

English translation of the "Notice of Opinion of First Examination" from the China's Patent Office, dated Jun. 5, 2009.

"Notice of Opinion of First Examination" from the China's Patent Office, dated Jun. 5, 2009, in Chinese.

Non-Final Office Action: mail date Feb. 4, 2009; published by the USPTO in U.S. Appl. No. 11/337,262, pp. 14.

Non-Final Office Action; mail date Jan. 23, 2009; published by the USPTO in U.S. Appl. No. 11/337,256, pp. 20.

Final Office Action: mail date Jul. 7, 2009; published by the USPTO in U.S. Appl. No. 11/337,256, pp. 18.

Non-Final Office Action: mail date Feb. 4, 2009; published by the USPTO in U.S. Appl. No. 11/337,261; pp. 20.

Non-Final Office Action: mail date Jul. 9, 2009; published by the USPTO in U.S. Appl. No. 12/125,204; pp. 23.

Non-Final Office Action of U.S. Appl. No. 12/125.148, Jun. 22, 2010, USPTO, Alexandria, VA, USA.

Response to Non-Final Office Action of U.S. Appl. No. 12/125,148, Sep. 15, 2010, Austin, TX, USA.

James E. Bostick, et al. as Applicants, Amendment Accompanying RCE, mail date Mar. 23, 2010, published by Applicants in U.S. Appl. No. 12/125,204, pp. 12.

Office Action (Mail Date Jul. 21, 2011) for U.S. Appl. No. 10/863,194, filed May 22, 2008.

Office Action (Mail Date Nov. 26, 2010) for U.S. Appl. No. 12/125,148, filed May 22, 2008.

Office Action (Mail Date Oct. 25, 2011) for U.S. Appl. No. 12/125,204, filed May 22, 2008.

* cited by examiner

COMMUNICATION WITH DATABASE CLIENT USERS

CROSS-REFERENCES TO RELATED APPLICATIONS

Pursuant to 35 USC §120, this continuation application claims priority to and benefit of U.S. patent application Ser. No. 11/337,262, entitled "SYSTEMS, METHODS, AND MEDIA FOR COMMUNICATION WITH DATABASE CLIENT USERS", filed on Jan. 20, 2006, and now abandoned, the disclosure of which is incorporated herein in its entirety for ail purposes.

FIELD OF INVENTION

The present invention is in the field of data processing systems and, in particular, to systems, methods and media for communication with database client users, such as from a database server.

BACKGROUND

Computer systems such as personal computers (PCs), servers, workstations, and mainframes are well known in the art. Computer systems have attained widespread use for providing computing power to many segments of today's modern society. One important function for computer systems is to access, modify, and share information. To accomplish this, information is often stored in a database so that it may be shared among many computer systems. Databases typically have a database manager to facilitate access, manipulation, or storage of the information in the database by other computer systems. The database manager may typically execute on a database server while computer systems using the database may serve as database clients in a client-server relationship. Example database managers include International Business Machine Corporation's (IBM®'s) DB2® database management system, Microsoft Corporation's Microsoft® SQL Server system, Oracle Corporation's Oracle® database management system, or Sybase, Inc.'s® database management system. Database servers and their clients may run on various operating system platforms and database clients (and their applications) communicate with the database server in order to obtain data from the server.

A database administrator (DBA) may be responsible for managing the environmental aspects of a database such as recoverability, resource management, integrity, security, availability, performance, and development and testing support. Database server support commonly offers the ability for the database server to notify the DBA of events (such as table locks) for which the DBA has requested notification as well as sending return codes (such as error, warning or informational codes) to a connected application. Often, a DBA wishes to inform database client users of particular events, such as when the database needs to be taken down or recycled for maintenance, when the database has performance problems, or other occurrences. By informing database client users of the problem (as well as estimated timelines for completion or workarounds), the DBA may provide better service to database clients and reduce the frustration some database client users feel when the database becomes unavailable for reasons unknown to them.

One solution to this problem is to use instant messaging (IM) systems to send messages from the DBA to database client users. This solution, however, suffers from a significant problem in that the DBA must know the IM identity of the database client users who are connected to the database in order to send them an IM message. In a typical large database, the DBA will not know which particular database client users are connected at any given time and therefore cannot effectively send them IM messages. Moreover, DBAs and database client users often change (such as for different shifts) and are often remote, increasing the difficulty of knowing which database client users are presently using the database. Such a solution may also rely on the availability of an IM server to forward the message, as well as both sender and receiver being logged on, further limiting the usefulness of IM. There is, therefore, a need for an efficient and effective mechanism for communication with database client users.

SUMMARY OF THE INVENTION

The problems identified above are in large part addressed by systems, methods and media for communication with database client users. Embodiments may include a method for communicating with the user of a database client. Embodiments may include receiving a message request to send to one or more database clients, the message request including message content and an indication of the one or more database clients to which a message will be sent. Embodiments may also include determining an Internet Protocol (IP) address associated with each of the one or more database clients based on the message request and transmitting a message to each of the determined IP addresses, where the message includes the message content. Embodiments may also include, at a database client associated with one of the IP addresses, receiving the transmitted message, generating a display window for the message, and displaying the message in the display window. An administrator using the disclosed methodology may accordingly transmit anonymous point-to-point messages to database clients for display to its database client users without having to know the identity, IM address, or other information about the database client users.

Another embodiment provides a machine-accessible medium containing instructions effective, when executing in a data processing system, to cause the system to perform a series of operations for communicating with a user of a database client. The series of operations generally includes receiving a message request to send to one or more database clients, the message request including message content and an indication of the one or more database clients to which a message will be sent. Embodiments may also include a series of operations for determining an Internet Protocol (IP) address associated with each of the one or more database clients based on the message request and transmitting a message to each of the determined IP addresses, where the message includes the message content. Embodiments may also include, at a database client associated with one of the IP addresses, a series of operations for receiving the transmitted message, generating a display window for the message, and displaying the message in the display window.

A further embodiment provides a database messaging system. The database messaging system may generally include a database server having a database messaging module. The database messaging module may include a database administrator (DBA) interface module to receive a message request, where the message request includes message content and an indication of one or more database clients to which a message will be sent. The database messaging module may also include an address module to determine an IP address associated with each of the one or more database clients to which a message will be sent and a database messaging transmitter to transmit a message to each determined IP address, where the message may include the message content. Further embodiments may include one or more database clients in communication with the database server via a network, where each database client included a database application and a client listener for receiving the message from the database server and displaying it on the database client's monitor.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

Figure 1:
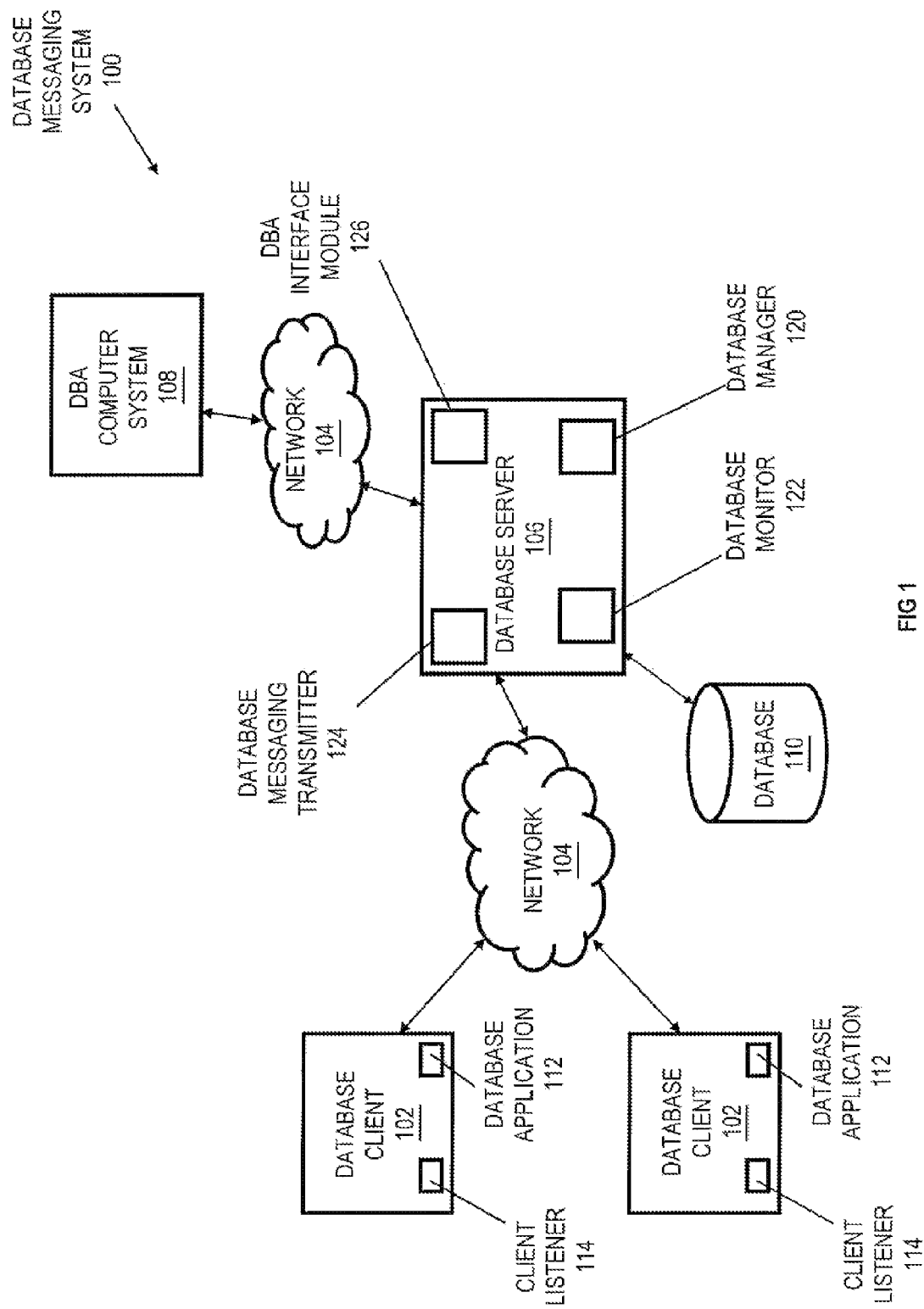
FIG. 1 depicts an environment for a database messaging system with a database server and one or more database clients according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for communicating with a database client user are disclosed. Embodiments may include a database messaging system having a database server and one or more database clients. The database server may include a database messaging module, which may include a database administrator (DBA) interface module to receive a message request, where the message request includes message content and an indication of one or more database clients to which a message will be sent. The database messaging module may also include an address module to determine an IP address associated with each of the one or more database clients to which a message will be sent and a database messaging transmitter to transmit a message to each determined IP address, where the message may include the message content. The database clients may include a client listener for receiving the message from the database server and displaying it on the database client's monitor.

The system and methodology of the disclosed embodiments provides for an effective and efficient way of communicating with a database user. By determining the IP address for the database clients to which a DBA desires to send a message, the DBA may advantageously send messages to users of those database clients without knowing the identity of those database client users. The DBA may accordingly warn database client users of upcoming database interruptions or provide other information just to the database client users who are impacted by the information. In contrast to using an Instant Messaging (IM) system, a DBA using the disclosed methodology need not know the name, e-mail address, IM address, or other information about a database client user and instead the disclosed system may rely on the network address of the database client user's computer (the database client) to provide communication. The disclosed system also advantageously does not rely on IM or e-mail servers or other external computer systems to perform its task, increasing the robustness of the solution.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Turning now to the drawings, FIG. 1 depicts an environment for a database messaging system with a database server and one or more database clients according to one embodiment. In the depicted embodiment, the database messaging system 100 includes a plurality of database clients 102 in communication with a database server 106 via a network 104 and a database 110 in communication with the database server 106. An optional database administrator (DBA) computer system 108 may also be in communication with the database server 106 via a network 104. Each database client 102 may include a database application 112 to access the database 110 through the database server 106 and a client listener 114 to receive messages from the database server 106. The database server 106 may manage communications to and operations with database 110 and may also, as described in more detail subsequently, facilitate communications from a DBA to users of the database clients 102.

In the database messaging system 100, any of the database clients 102, the database server 106, the DBA computer system 108, and the database 110 may be located at the same location, such as in the same building or computer lab, or could be remote. While the term "remote" is used with reference to the distance between the components of the database messaging system 100, the term is used in the sense of indicating separation of some sort, rather than in the sense of indicating a large physical distance between the systems. For example, any of the components of the database messaging system 100 may be physically adjacent or located as part of the same computer system in some network arrangements, such as when the database server 106 and DBA computer system 108 are part of the same computer system.

Each database client 102 may include one or more personal computers, workstations, servers, mainframe computers, notebook or laptop computers, desktop computers, PDAs, set-top boxes, mobile phones, wireless devices, or the like. In some embodiments, a database client 102 may be a computer system as described in relation to FIG. 2. The database client 102 may be in wired or wireless communication with network 104. A database client user may utilize a database client 102 and its database application 112 to facilitate the access, viewing, and use of content on database 110 through the use of database server 106. Application 112 may include any type of executable application that accesses database 110, such as an application that uses files from database 110, a word processor, a spreadsheet, business applications (e.g., industry-specific software), a browser, or any other type of application. The client listener 114 may receive messages from the DBA through the database server 106, generate a display window (such as a new window or pop-up window), and display the message to the database client user. As will be described in more detail subsequently, the client listener 114 may monitor a predetermined port and act as a server on the database client 102 machine. The client listener 114 may optionally be incorporated into the database application 112 or any database management software installed on the database client 102.

Network 104 may be any type or combination of data communications channel(s), such as the Internet, an intranet, a local area network (LAN), a wide area network (WAN), an Ethernet network, a wireless network, a proprietary network, or a broadband cable network. In one exemplary embodiment, a corporate intranet implemented on a LAN may serve as network 104 for communications between components of a corporate database messaging system 100. Those skilled in the art will recognize, however, that the invention described herein may be implemented utilizing any type of data communications channel or combinations of data communication channels.

The database server 106 provides an interface between database clients 102 and database 110 by facilitating access, manipulation, and storage of information in database 110 by database applications 112 of the database clients 102. The database server 106 may be one of more of any type of computer system, including servers, personal computers, workstations, mainframe computers, notebook or laptop computer, desktop computers, or the like. In some embodiments, the database server 106 may be a computer system as described in relation to FIG. 2. An example database server 106 is an IBM® eServer® server or similar server. In this example, the database server 106 may include software such as IBM®'s DB2® database management system application that provides an effective and robust database platform.

The database server 106 may include modules such as a database manager 120, a database monitor 122, a database messaging transmitter 124, arid a DBA interface module 126. The database manager 120 may a database management system such as IBM®'s DB2® database management system, Microsoft®'s SQL Server system, Oracle®'s database management system, or Sybase, Inc.'s® database management system. The database manager 120 may facilitate access, manipulation, or storage of information in database 110 by database applications 112 of the database clients 102. The database monitor 122 may monitor database 110 activities and may also allow database server support to communicate with the DBA. The database monitor 122 may monitor any type of database 110 activity, such as when records are inserted, updated, or deleted, deadlock of the database 110, or exceeding a predefined threshold for file system size. The database monitor 122 may log these activities and/or notify the DBA upon their occurrence.

Figure 3:
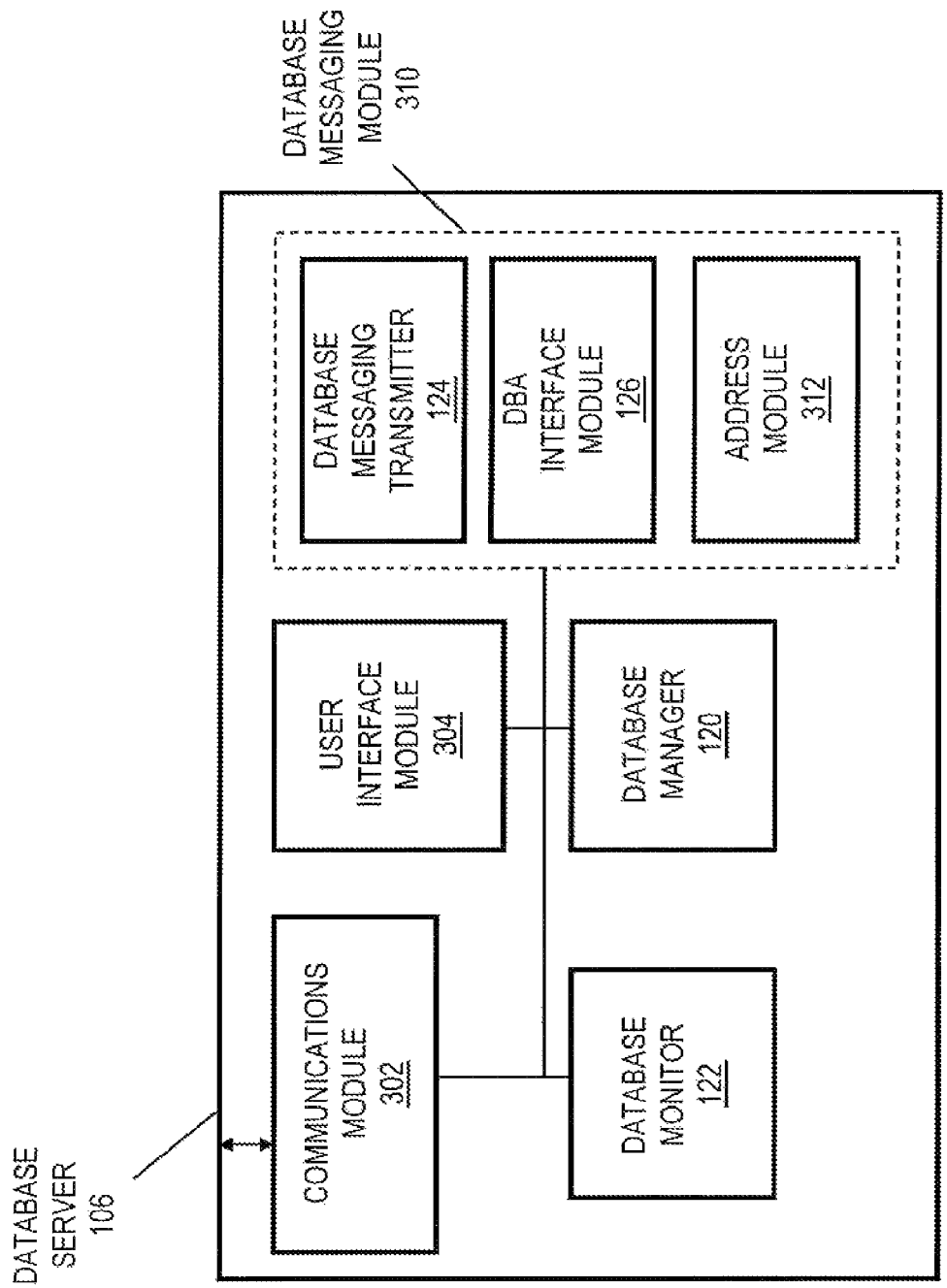
FIG. 3 depicts a conceptual illustration of software components of a database server with a database messaging module according to one embodiment.

The database messaging transmitter 124 and DBA interface module 126 (which may both be part of a database messaging module as described in relation to FIG. 3) may provide for communications between the DBA and users of the database clients 102. The DBA interface module 126 may receive a message request from a DBA or other person to be sent to one or more database client users via their database client connections. In some embodiments, the DBA interface module 126 provides a graphical user interface (GUI) with which the DBA may input information. The message request may include both message content (including message text, files for attachment, or other information) and an indication of the database client user or users to whom the message should be sent. A DBA or other authorized person may be using a DBA computer system 108, may be directly accessing database server 106, or using another computer system. After receiving the message request, the database messaging transmitter 124 may then transmit a message to the network address (i.e., IP address) for each database client 102. The database messaging transmitter 124 may effectively serve as a client to the client listener 114 of the receiving database clients 102. Database servers 102 generally have access to the IP or other network address for all connected database clients 102 and may advantageously use this IP address to communicate with database client users. By utilizing the IP address of the database client 102, DBAs may advantageously transmit messages to database client users via their database client connection without having to know the identity, IM address, e-mail address, or other information about the database client users.

The database 110 may be a collection of related information accessed and managed by a database management system such as database manager 120. Database 110 may be any type of database, such as a hierarchical database or a relational database. Most modern databases are relational databases whose management systems restrict data access to a messaging protocol such as SQL, a nonprocedural language that allows a programmer to specify desired results. Example databases 110 may be consistent with management systems such as IBM®'s DB2® database management system, Microsoft®'s SQL Server system, Oracle®'s database management system, or Sybase, Inc.'s ® database management system. The data of database 110 may be stored on one or more storage media such as hard drives, on a storage area network (SAN), tape backup, network attached storage (NAS), or in any other fashion or combination of fashions. An example hardware solution to store a database 110 may be IBM®'s TotalStorage® line of disk storage systems.

Using the disclosed system, a DBA may efficiently and effectively send messages to database client users. The DBA may select one or more database clients 102 as well as some sort of message, and the database server 106 may then transmit the message to the IP addresses associated with those database clients 102. The database clients 102 for each of those IP addresses may then receive and display the message to their database client users, such as via a pop-up window. A DBA may, for example, notify all database client users who are currently accessing database 110 by specifying the database name before recycling the database 110 so that the database client users know the reason for the outage and how long it is scheduled to last. By selecting a plurality of database clients 102 and database client users with a database name, the DBA may effectively broadcast a message to all of those database client users. Under previous systems, a database client user may not know why the database 110 was down or for how long it might be down, resulting in a frustrating experience. Similarly, if a DBA noticed that a particular database client 102 at a particular IP address was locking database server 106 resources and causing system performance to slow, the DBA could inform the database client users before terminating the database client user's application or with a recommendation for corrective action. For these and other examples, the DBA need not know the identity of the database client user and instead may rely on the client IP address maintained by the database server 106.

Components of the database messaging system 100, such as the client listener 114 of the database client 102 and the database messaging transmitter 124 of the database server 106, may be installed with the database or installed at a later time, such as part of an upgrade or a separate module.

Figure 2:
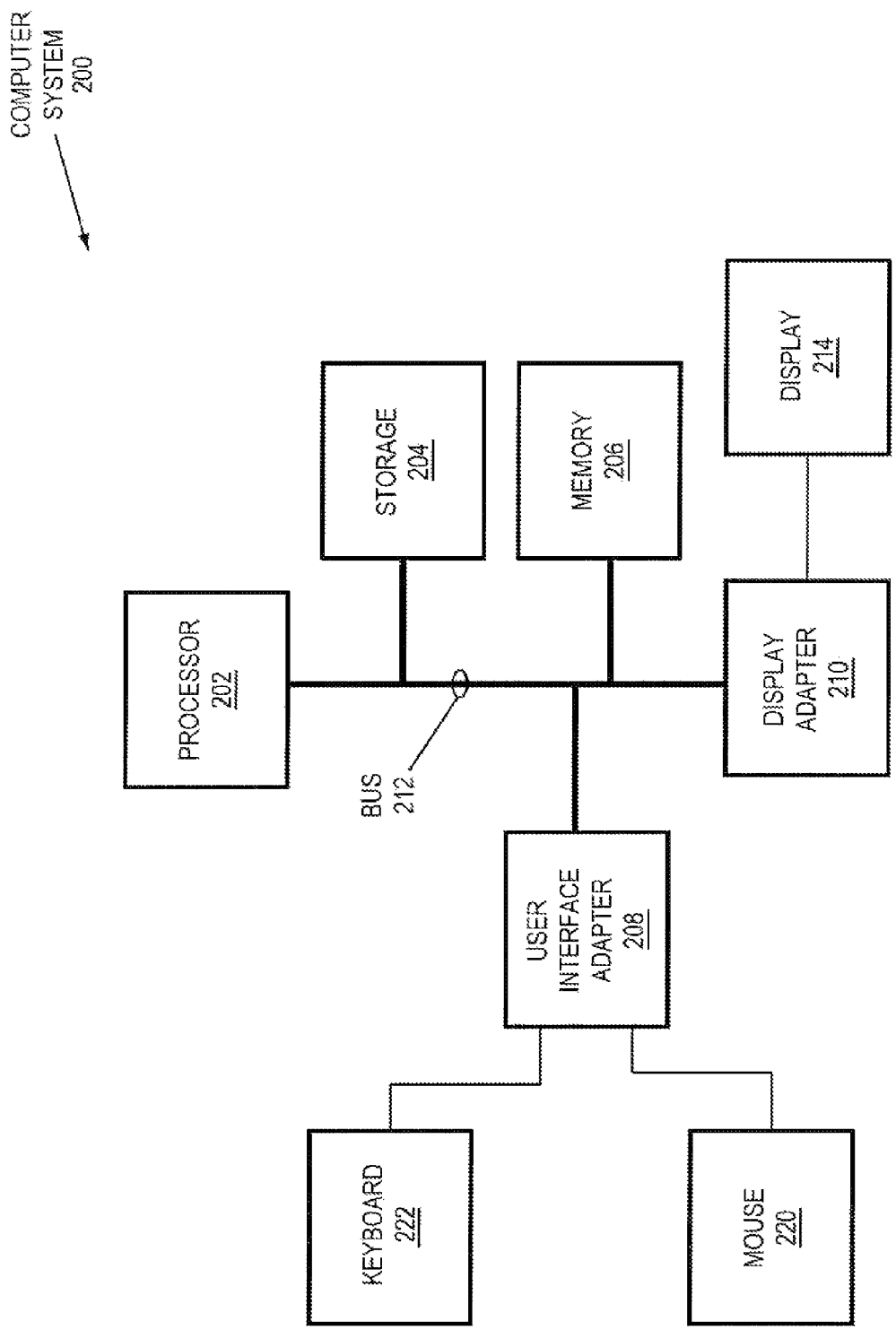
FIG. 2 depicts a block diagram of one embodiment of a computer system suitable for use as a component of the database messaging system.

FIG. 2 depicts a block diagram of one embodiment of a computer system 200 suitable for use as a component of the database messaging system 100, such as a database client 102, a database server 106, or a DBA computer system 108. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor, or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM).

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A DBA may utilize the user interface devices of a DBA computer system 108, for example, to input message text and to submit a message request. The bus 212 may also connect the processor 202 to a display 214, such as an LCD display or CRT monitor, via the display adapter 210. A database client 102 that receives a message from the database server 106 may display that message in a window of display 214 in some embodiments for viewing by database client users.

FIG. 3 depicts a conceptual illustration of software components of a database server with a database messaging module according to one embodiment. The database server 106 of the depicted embodiment includes a database manager 120, a database monitor 122, a database messaging transmitter 124, a DBA interface module 126, a communications module 302, a user interface module 304, and a database messaging module 310. The database messaging module 310 may include an address module 312 in addition to the database messaging transmitter 124 and the DBA interface module 126. The database manager 120, database monitor 122, database messaging transmitter 124, and DBA interface module 126 are described in relation to FIG. 1 and the description will not be repeated for the sake of brevity.

The communications module 302 may facilitate communications to and from the database server 106 via network 104, such as communications with database clients 102 or the DBA computer system 108. The user interface module 304 may receive user input from user input devices such as a mouse or keyboard and may also provide output to a user, such as via a display or speaker.

The database messaging module 310 and its components may receive message requests from a DBA to be sent to one or more database clients 102, determine the IP addresses associated with the database clients 102, and transmit a message to those IP addresses. As described previously, the DBA interface module 126 may receive the message request that includes message content and an indication of one or more database clients 102 to which the message will be sent. The address module 312 may determine an IP address associated with each of the one or more database clients 102 to which a message will be sent, after which the database messaging transmitter 124 may transmit the message to the determined IP addresses.

The address module 312 may determine the IP addresses in a number of fashions. If a DBA submits a list of one or more IP addresses of different database clients 102 (such as by selecting IP addresses from a list), the address module 312 may simply use those IP addresses (after optionally converting them to decimal format). If the DBA specifies a database name, the address module 312 may determine all of the IP addresses currently active with of associated with that database. If a particular database client 102 is connected more than once to the same database 110, duplicate IP addresses may be eliminated. By allowing the DBA to specify a database name, the DBA may effectively broadcast a message to all connected database clients 102 without having to specify each individually. The address module 312 may use any methodology to translate the indication of database clients 102 received from the DBA to a list of one or more IP addresses.

Figure 4:
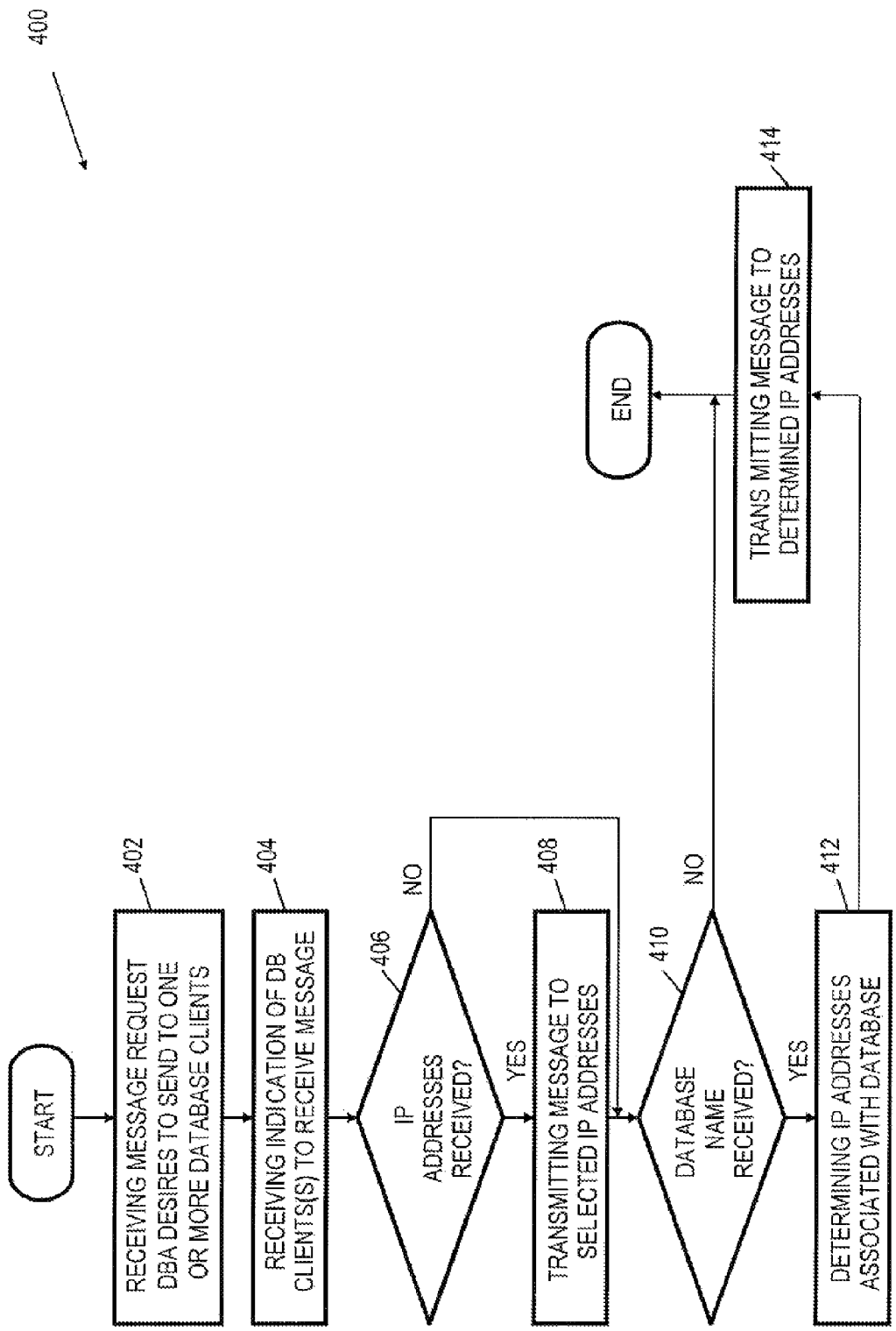
FIG. 4 depicts an example of a flow chart for receiving a message request and transmitting a message to one or more database clients according to one embodiment.

FIG. 4 depicts an example of a flow chart for receiving a message request and transmitting a message to one or more database clients according to one embodiment. In one embodiment, components of a database server 106 such as the database messaging module 310 and its components may perform the elements of flow chart 400. In the depicted embodiment, flow chart 400 begins with element 402, where the DBA interface module 126 of the database messaging module 310 may receive a message request from the DBA or other authorized person that includes message content that the DBA desires to send to one or more database clients 102 and/or database client users. As described previously, the DBA interface module 126 may receive the message request from a DBA computer system 108 or from a DBA directly accessing the database server 106. As part of the receiving the message request, the DBA interface module 126 may also receive an indication of the one or more database clients 102 to receive the message at element 404. The indication of database clients 102 to receive the message may be a list of IP addresses for the database clients 102, a database name, or other indication or combination of indications. In some embodiments, the message request may include both the message content (e.g., message text, file attachments) and the indication of database clients 102.

After receiving the message request (with its indication of database clients 102), the address module 312 of the database messaging module 310 may determine the IP addresses associated with the database client 102 indications. At decision block 406, the address module 312 may determine whether one or more IP addresses were received as the database client 102 indications. If IP addresses were received, the address module 312 may determine the IP addresses for the messaging recipients by converting those IP addresses as necessary, such as by converting them to the decimal format. The database messaging transmitter 124 may then transmit the message (based on the message content) to the selected IP addresses at element 408. At decision block 410, the address module 312 may determine whether one or more database names were received as part of the database client 102 indication. If a database name was received, the method of flow chart 400 continues to element 412, where the address module 312 may determine the IP addresses associated with the database name, such as by cross-referencing the database name with a list of IP addresses currently accessing that database. The address module 312 may also eliminate duplicate IP addresses that may occur when a database client 102 is logged in multiple times. The database messaging transmitter 124 may then transmit the message to the determined IP addresses at element 414, after which the method terminates.

While the database messaging transmitter 124 is depicted as potentially transmitting a message separately at elements 408 and 414, some or all of the transmission may be combined into one transmission before termination of method 400. Moreover, the received indication of one or more database clients 102 received as part of the message request may include a plurality of different methods for indicating database clients 102. For example, a message request may include a list of three IP address as well as a database name. In this example, after all the relevant IP addresses are determined by the address module 312, the database messaging transmitter 124 may transmit the message to all IP addresses simultaneously if so desired.

Figure 5:
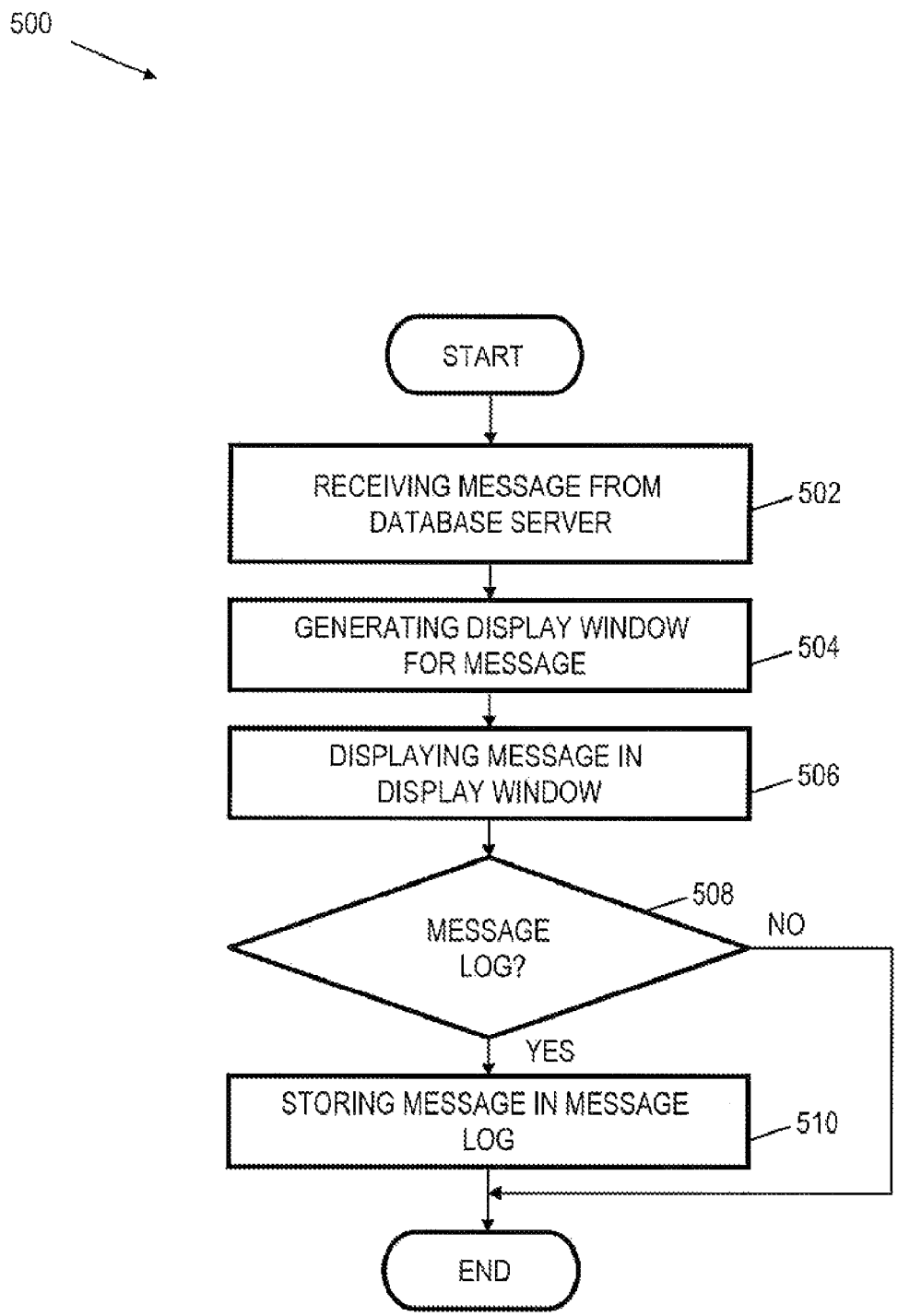
FIG. 5 depicts an example of a flow chart for receiving a message from a database server and displaying the message to a database client user according to one embodiment.

FIG. 5 depicts an example of a flow chart for receiving a message from a database server and displaying the message to a database client user according to one embodiment. In one embodiment, components of a database client 102 may perform the elements of flow chart 500. In the depicted embodiment, flow chart 500 begins with element 502, where the client listener 114 of a database client 102 may receive a message from the database server 106. The database client 102 executing the client listener 114 has an IP address matching one of the IP addresses determined by the address module 312 as described in relation to FIG. 4. As described previously, the client listener 114 may listen on a specified or predetermined port of the database client 102 for the message. In doing so, the client listener 114 may act as the server on the database client 102 with respect to the database messaging transmitter 124.

After receiving the message, the client listener 114 may optionally generate a display window for the message at element 502, such as by creating such a display window or requesting another application to do so. A display window may be, for example, any aspect of a graphical user interface (GUI) that allows a message to be displayed such as a browser instantiation, a pop-up window, a text window, etc. Alternatively, the client listener 114 may utilize an existing window, such as in the case of repeated messages from a DBA. The client listener 114 may then, at element 506, display the message in the display window, allowing a user of the database client 102 to view the message from the DBA. In some embodiments, the display window may preempt other items on the user's display 214 so that they are more likely to see the message.

The client listener 114 may also optionally determine whether to save the message in a message log at decision block 508. If the message will not be saved, the method of flow chart 500 may simply terminate. If the message will be saved, the client listener 114 may store the message in a message log at element 510, after which the method terminates.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for communication with a user of a database client. It is understood that the form of the invention shown and described in the detailed description and the drawings are to be taken merely as examples. It is intended that the following claims be interpreted broadly to embrace all the variations of the example embodiments disclosed.

What is claimed is:

1. A computer-implemented method for communicating with a user of a database client, the method comprising:
   receiving, by a database server having one or more processors, from a database administrator not accessing a particular database as a user a message request to send to all database clients currently active with the particular database, the received message request comprising message content, an indication of the particular database to whose database clients a broadcast message will be sent, and a plurality of additional IP addresses to which the broadcast message is to be sent;
   determining by the database server an Internet Protocol (IP) address pertaining to each database client currently active with the particular database by determining each IP address currently active with the particular database without utilizing identification of any database clients currently active with the particular database; and
   transmitting by the database server the broadcast message in one transmission to the IP addresses pertaining to the particular database and in another transmission to each IP address of the additional IP addresses, the broadcast message comprising the received message content.

2. The method of claim 1, wherein all of the IP addresses pertaining to the particular database are determined before the broadcast message is transmitted to any of the IP addresses pertaining to the particular database.

3. The method of claim 1, wherein said transmitting the broadcast message to each of the IP addresses pertaining to the particular database is performed after said transmitting the broadcast message to each IP address of the additional IP addresses is performed.

4. The method of claim 1, wherein said transmitting the broadcast message to each of the IP addresses pertaining to the particular database is performed before said transmitting the broadcast message to each IP address of the additional IP addresses is performed.

5. A storage device, comprising a memory having machine-accessible program code stored therein, said program code configured to be executed by a database server having one or more processors to implement a method for communicating with a user of a database client, said method comprising:

receiving, by the database server, from a database administrator not accessing a particular database as a user, a message request to send to all database clients currently active with the particular database, the received message request comprising message content, an indication of the particular database to whose database clients a broadcast message will be sent, and a plurality of additional IP addresses to which the broadcast message is to be sent;

determining by the database server an Internet Protocol (IP) address pertaining to each database client a currently active with the particular database by determining each IP address currently active with the particular database without utilizing identification of any database clients currently active with the particular database; and transmitting by the database server the broadcast message in one transmission to the IP addresses pertaining to the particular database and in another transmission to each IP address of the additional IP addresses, the broadcast message comprising the received message content.

6. The storage device of claim 5, wherein all of the IP addresses pertaining to the particular database are determined before the broadcast message is transmitted to any of the IP addresses pertaining to the particular database.

7. The storage device of claim 5, wherein said transmitting the broadcast message to each of the IP addresses pertaining to the particular database is performed after said transmitting the broadcast message to each IP address of the additional IP addresses is performed.

8. The storage device of claim 5, wherein said transmitting the broadcast message to each of the IP addresses pertaining to the particular database is performed before said transmitting the broadcast message to each IP address of the additional IP addresses is performed.

9. A computer system, comprising a storage device and a database server having one or more processors, said storage device comprising a memory having machine-accessible program code stored therein, said program code configured to be executed by the database server to implement a method for communicating with a user of a database client, said method comprising:

receiving, by the database server, from a database administrator not accessing a particular database as a user a message request to send to all database clients currently active with the particular database, the received message request comprising message content, an indication of the particular database to whose database clients a broadcast message will be sent, and a plurality of additional IP addresses to which the broadcast message is to be sent;

determining by the database server an Internet Protocol (IP) address pertaining to each database client a currently active with the particular database by determining each IP address currently active with the particular database without utilizing identification of any database clients currently active the particular database; and transmitting by the database server the broadcast message in one transmission to the IP addresses pertaining to the particular database and in another transmission to each IP address of the additional IP addresses, the broadcast message comprising the received message content.

10. The computer system of claim 9, wherein all of the IP addresses currently active with the particular database are determined before the broadcast message is transmitted to any of the IP addresses pertaining to the particular database.

11. The computer system of claim 9, wherein said transmitting the broadcast message to each of the IP addresses pertaining to the particular database is performed after said transmitting the broadcast message to each IP address of the additional IP addresses is performed.

12. The computer system of claim 9, wherein said transmitting the broadcast message to each of the IP addresses pertaining to the particular database is performed before said transmitting the broadcast message to each IP address of the additional IP addresses is performed.

\* \* \* \* \*